(12) United States Patent
Lu (10) Patent No.: US 6,439,111 B1
(45) Date of Patent: Aug. 27, 2002

(54) COLLAPSIBLE BARBECUE GRILL

(76) Inventor: Chien-Chang Lu, P.O. Box 90, Tainan City (TW)

(*) Notice: Subject to any disclaimer, the term of this patent is extended or adjusted under 35 U.S.C. 154(b) by 0 days.

(21) Appl. No.: 10/067,227

(22) Filed: Feb. 7, 2002

(51) Int. Cl.[7] .................. A47J 37/00; A47J 37/07
(52) U.S. Cl. .................. 99/449; 99/340; 99/421 H; 99/450; 99/482; 126/9 R; 126/25 R
(58) Field of Search .............. 99/339, 340, 419, 99/421 H, 421 HH, 421 V, 421 HV, 421 M, 421 P, 421 TP, 449, 450, 448, 447, 481, 482; 126/9 R, 25 RA, 25 AA, 41 R, 29, 30

(56) References Cited

U.S. PATENT DOCUMENTS

| | | | | |
|---|---|---|---|---|
| 3,230,948 A | * | 1/1966 | Schmitt | 99/421 H |
| 3,391,682 A | * | 7/1968 | King et al. | 99/448 X |
| 3,459,171 A | * | 8/1969 | Swanson | 99/450 X |
| 3,503,324 A | * | 3/1970 | Gmeiner | 126/9 R |
| 3,999,472 A | * | 12/1976 | Einto | 99/340 |
| 4,106,473 A | * | 8/1978 | Wandel | 99/340 X |
| 4,508,096 A | * | 4/1985 | Slattery | 126/9 R |
| 4,569,327 A | * | 2/1986 | Velten | 126/25 A |
| 5,105,726 A | * | 4/1992 | Lisker | 99/449 X |
| 5,243,961 A | * | 9/1993 | Harris | 126/9 R |
| 6,000,388 A | * | 12/1999 | Andress | 126/25 R |
| 6,182,560 B1 | * | 2/2001 | Andress | 99/449 X |

* cited by examiner

*Primary Examiner*—Timothy F. Simone (57) ABSTRACT

A collapsible barbecue grill in the present invention includes a body in a box shape capable of being pivoted with two side plates respectively disposed at both side walls thereof and a cover plate disposed at a rear wall thereof, each of the two side plates provided with a plurality of engagement grooves; a plurality of positioning members capable of being screwed with the cover plate for connecting the two side plates and the cover plate when the body is extended; and, a supporting frame capable of being placed across the two side plates of the body for supporting a grid member, by which a combination of the aforementioned components enables the barbecue grill of the present invention to be quickly extended in use or folded into a reduced dimension for the convenience of carrying and storage only occupied with minimal space.

3 Claims, 9 Drawing Sheets

COLLAPSIBLE BARBECUE GRILL

BACKGROUND OF THE INVENTION

1. Field of the Invention

This invention relates to a collapsible barbecue grill, particularly to one having a body in a box shape capable of being pivoted with two side plates respectively disposed at both side walls thereof and a cover plate disposed at a rear wall thereof, each of the two side plates provided with a plurality of engagement grooves; a plurality of positioning members capable of being screwed with the cover plate for connecting the two side plates and the cover plate when the body is extended; and, a supporting frame capable of being placed across the two side plates of the body for supporting a grid member, by which a combination of the aforementioned components enables the collapsible barbecue grill of the present invention to be quickly extended or folded with easiness, and to be convenient for carrying and storage only with occupied minimal space when folded.

2. Description of the Prior Art

Figure 1:
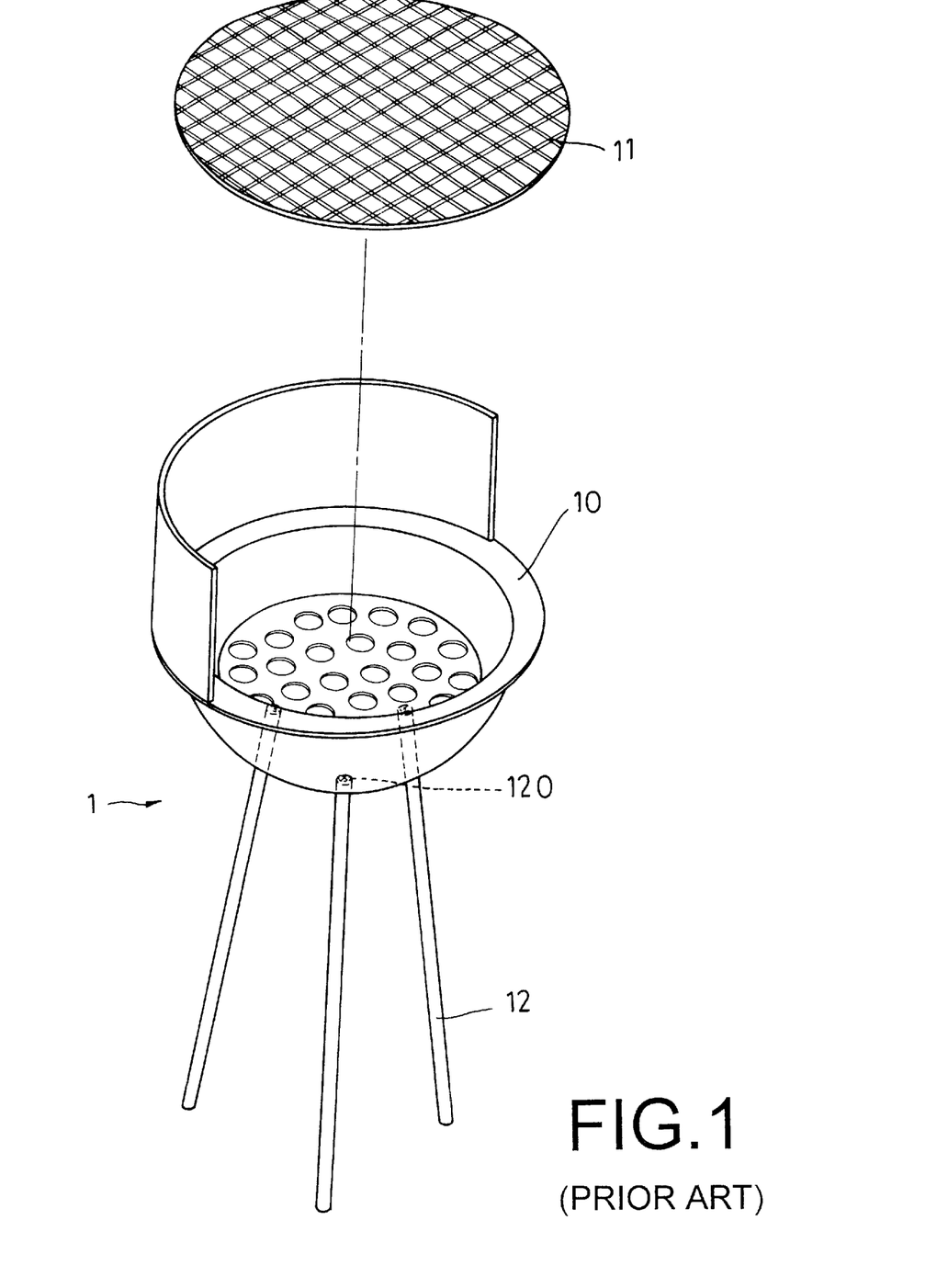
FIG. 1 is a schematic view showing the construction of a known conventional barbecue grill.

Generally speaking, a known conventional barbecue grill 1 has a body 10 provided with a grid member 11 placed thereon and legs 12 fixed to a bottom of the body 10 by screw members 120, as shown in FIG. 1. However, it is very inconvenient and time-consuming for users to take the legs 12 apart from the known barbecue grill 1 by unscrewing all the screw members 120 when the known barbecue grill 1 is not in use. Moreover, the known barbecue grill 1 is limited to be used in a fixed position without the possibility of being turned in different directions for users to choose a better grilling direction at any time or adjusted to various heights for users to select preferred heights according to the needs of users in different heights for a comfortable barbecue.

SUMMARY OF THE INVENTION

The main purpose of the invention is to offer a collapsible barbecue grill capable of being quickly extended in use or folded for the convenience of carrying.

The main feature of the invention is to provide a collapsible barbecue grill having a body in a box shape capable of being pivoted with two side plates respectively disposed at both side walls thereof and a cover plate disposed at a rear wall thereof, each of the two side plates provided with at least one passage formed therein and an insert groove disposed at a rear end thereof, a plurality of engagement grooves disposed at one side of each passage, two slots respectively disposed in proper places of both sides of the cover plate; a plurality of positioning members capable of being screwed with the cover plate for connecting the two side plates and the cover plate when the body is extended; and, a supporting frame capable of being placed across the two side plates of the body for supporting a grid member.

BRIEF DESCRIPTION OF DRAWINGS

This invention will be better understood by referring to the accompanying drawings, wherein.

DETAILED DESCRIPTION OF THE PREFERRED EMBODIMENT

Figure 2:
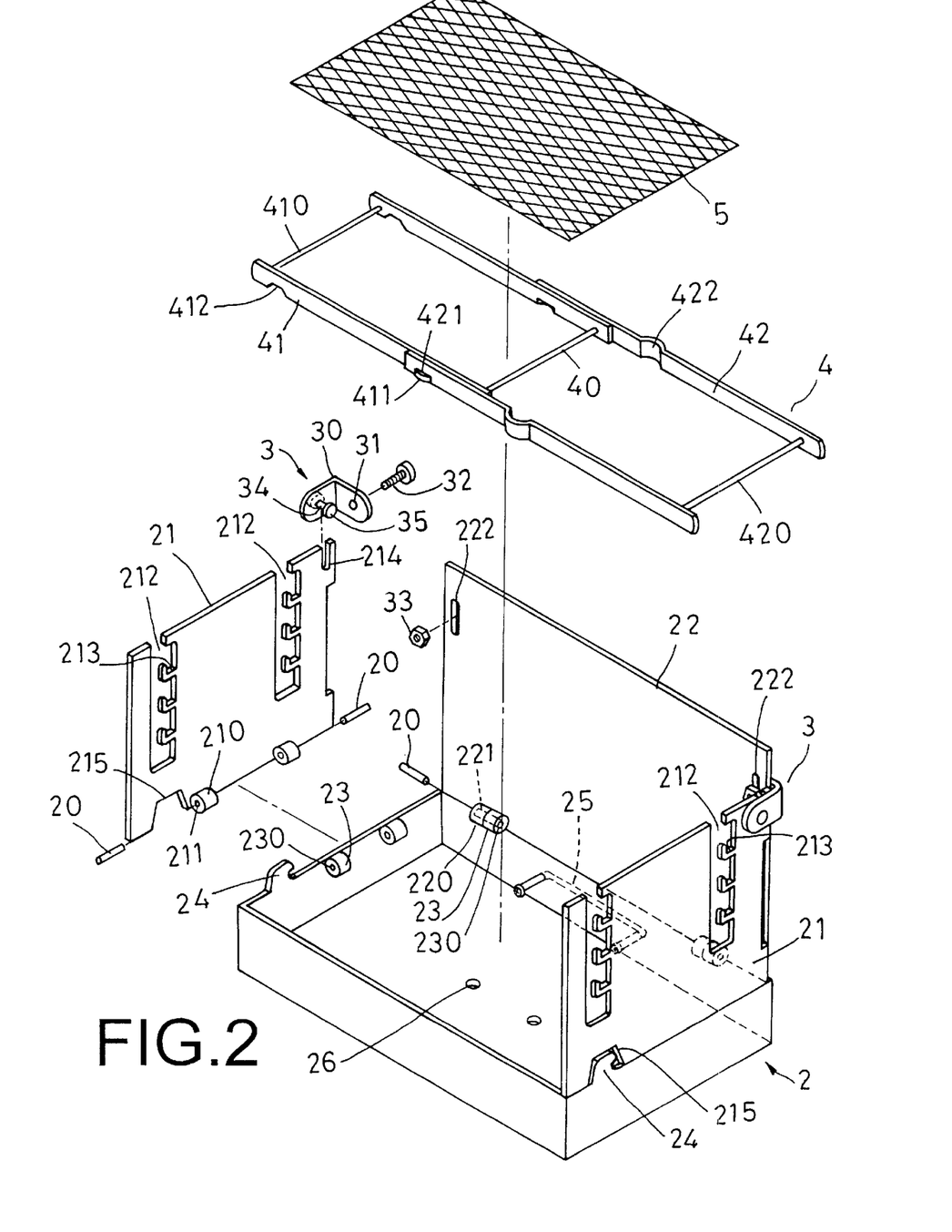
FIG. 2 is an exploded perspective view of a collapsible barbecue grill in the present invention.
Figure 3:
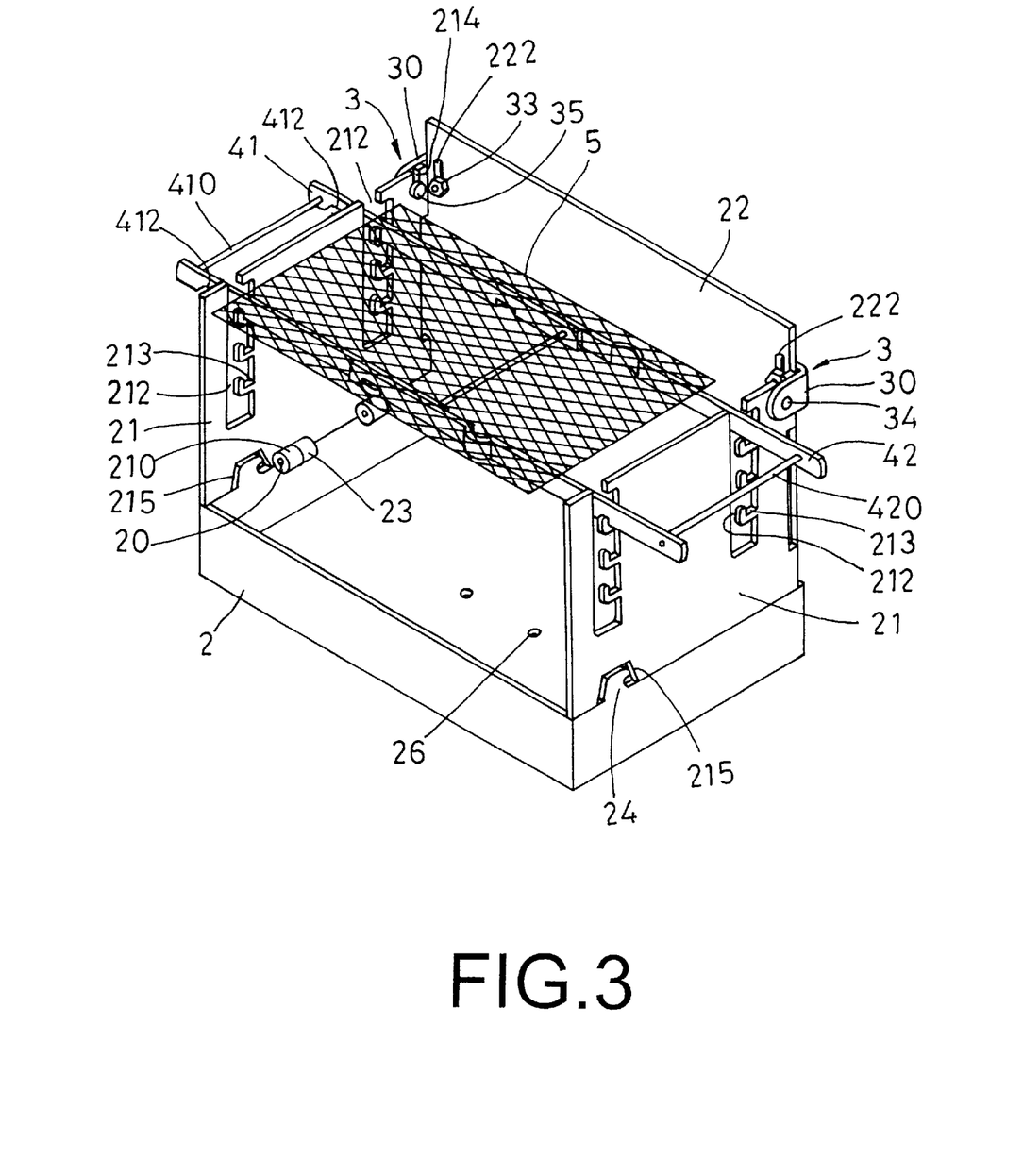
FIG. 3 is a schematic view of the collapsible barbecue grill in the present invention, showing a reference of an assemblage of the grill in operation.

A preferred embodiment of a collapsible barbecue grill in the present invention, as shown in FIGS. 2 and 3, mainly includes a body 2, two positioning members 3 and a supporting member 4.

The body 2 in a box shape is capable of being pivoted with two side plates 21 respectively disposed at both side walls thereof and a cover plate 22 disposed at a rear wall thereof by pivot pins 20. The body 2 has a plurality of knuckles 23 protruded around a peripheral edge of an inner surface thereof and each provided with a transverse through hole 230; two side plates 21 have a plurality of knuckles 210 protruded at their bottoms for corresponding to the knuckles 23 of the body 2 disposed at both side walls of the body 2 and each provided with a transverse through hole 211; the cover plate 22 has a plurality of knuckles 220 protruded at a bottom thereof for corresponding to the knuckles 23 of the body 2 disposed at the rear wall of the body 2 and each provided with a transverse through hole 221. Therefore, the knuckles 23 of the body 2 are capable of being respectively pivoted with the knuckles 210, 220 of the two side plates 21 and the cover plate 22 by having the pivot pins 20 extending through the transverse through holes 230, 211 and 221. Each of the two side plates 21 also has two passages 212 formed therein and each provided with a plurality of engagement grooves 213 disposed at one side, an insert groove 214 disposed at an upper portion of a rear end thereof, and a notch 215 disposed proximate a front end of the bottom thereof. The cover plate 22 also has two slots 222 respectively disposed in proper places of both sides thereof for being combined with the two positioning members 3. The body 2 also has two hooks 24 respectively upwards protruded in proper places proximate front ends of both side walls thereof for being correspondingly engaged with two positioning members 3 screwed with the cover plate 22 when the cover plate 22 is closed on the body 2, a movable handle 25 disposed at the rear wall thereof, and a plurality of screw holes 26 arranged in proper places of the bottom thereof.

Figure 4:
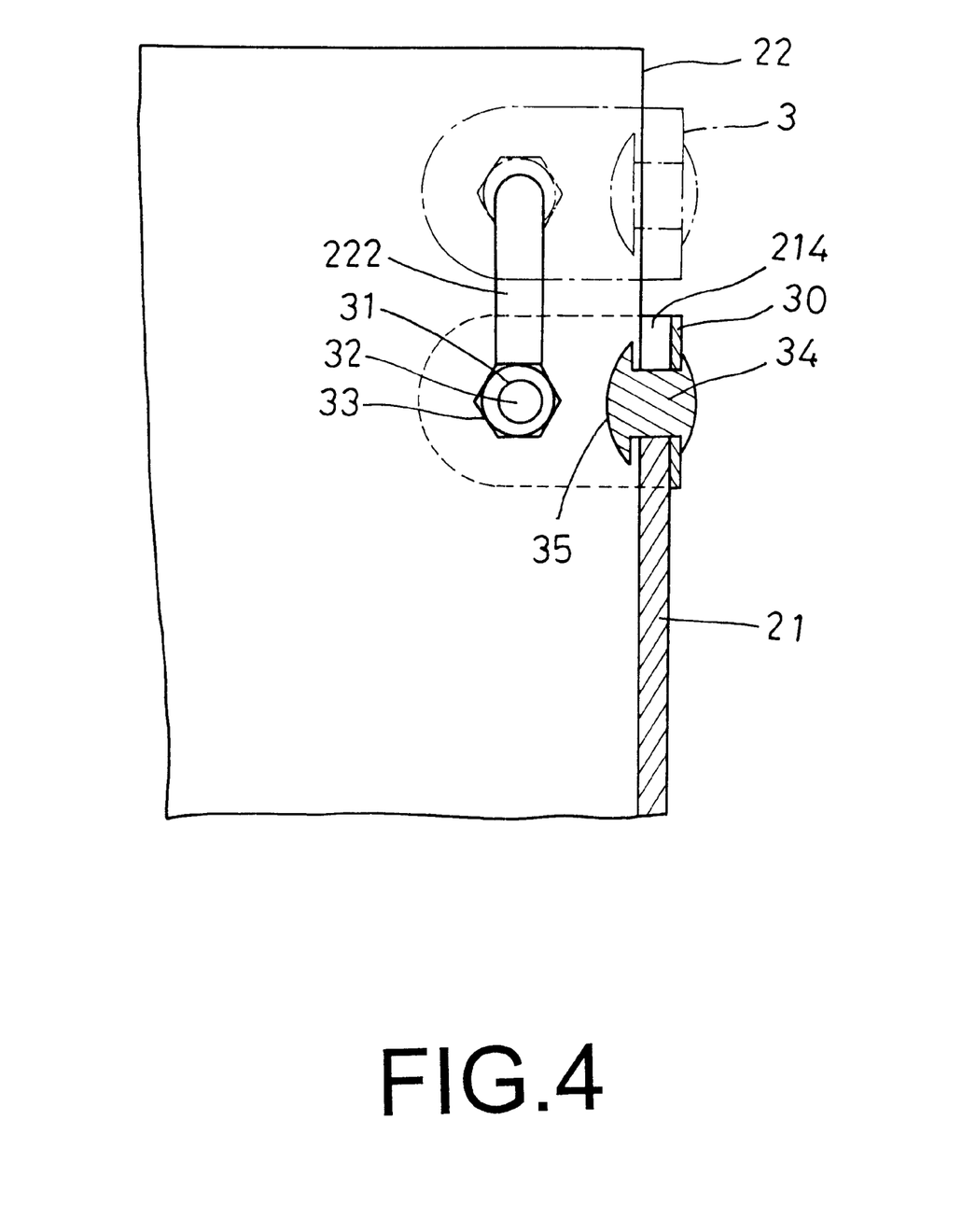
FIG. 4 is a schematic view of the collapsible barbecue grill in the present invention, showing a positioning member connected a side plate and a cover plate and slidable in a slot of the cover.

The two positioning members 3 are capable of being screwed with the cover plate 22 for connecting the two side plates 21 and the cover plate 22 when the body 2 is extended. Each of the two positioning members 3 includes an L-shaped connecting plate 30 having one side provided with a through hole 31 for corresponding to each of the two slots 222 of the cover plate 22 and being extended through by a threaded bolt 32 capable of being screwed by a nut 33, and the other side riveted with an engagement block 34 for being correspondingly engaged with each of the insert grooves 214 of the two side plates 21 and provided with a stop end 35 disposed at an inner end thereof and whose diameter is larger than the width of each of the insert grooves 214 of the two side plates 21 so that the stop end 35 can be stopped against an inner surface of each of the insert grooves 214 of the two side plates 21.

Figure 6:
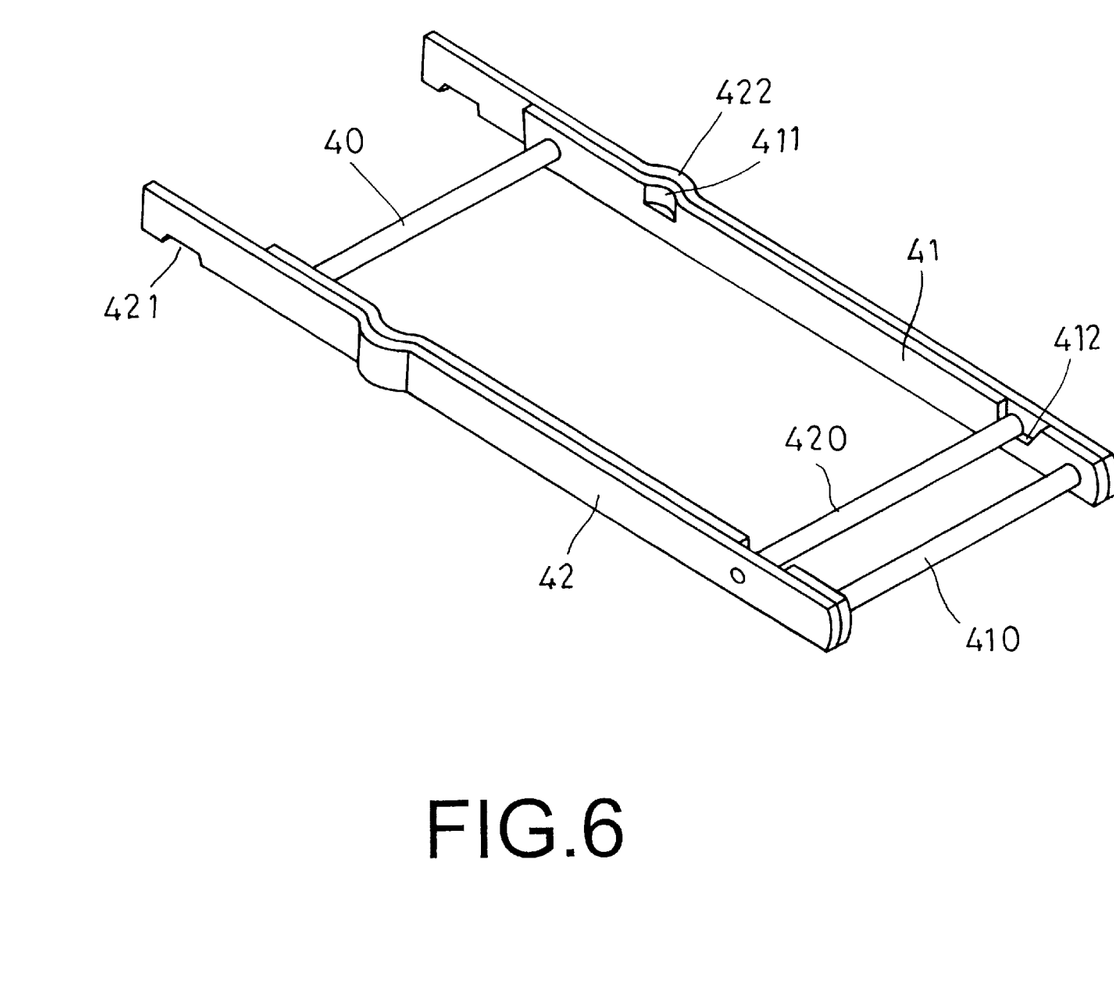
FIG. 6 is a schematic view of the collapsible barbecue grill in the present invention, showing the supporting member in a folded condition.

The supporting member 4 capable of being placed across the two side plates 21 of the body 2 for supporting a grid member 5 has a right frame 42 and a left frame 41 pivoted with the right frame 42 by a pivot rod 40. Two grips 410, 420 are respectively disposed at outer ends of the left frame 41 and the right frame 42. The left frame 41 has two stop blocks 411 respectively outwardly protruded in proper places of both sides thereof proximate the pivot rod 40 and two grooves 412 respectively disposed at both sides thereof proximate the grip 410 for accommodating the grip 420 of the right frame 42 when the supporting member 4 is folded. The right frame 42 has two engagement grooves 421 respectively disposed in proper places of both sides thereof opposite to the grip 420 for being engaged by the two stop blocks 411 of the left frame 41 when the supporting member 4 is extended and two grooves 422 respectively disposed in proper places proximate middle portions of both sides thereof for receiving the two stop blocks 411 of the left frame 41 when the supporting member 4 is folded, as shown in FIG. 6.

In using, referring to FIGS. 3 to 7, firstly attach an insert rod 6 to the bottom of the body 2 by having screw members 61 screwed from a plurality of screw holes 60 of the insert rod 6 into the screw holes 26 of the body 2 so that the insert rod 6 is ready to be inserted into a foldable extension tripod 7.

Secondly, open the cover plate 22 pivoted at rear wall of the body 2 and then combine the two positioning members 3 with the two slots 222 disposed at both sides of the cover plate 22 by having the connecting plates 30 of the two positioning members 3 respectively attached against outer surfaces of the two slots 222 of the cover plate 2 to make the through holes 31 of the connecting plates 30 of the two positioning members 3 respectively aligned with the two slots 222 of the cover plate 2, and further having the threaded bolts 32 of the two positioning members 3 extending through the two slots 222 of the cover plate 2 and the through holes 31 of the connecting plates 30 of the two positioning members 3 and screwed by the nuts 33 of the two positioning members 3 so that the two positioning members 3 can be combined with the two slots 222 of the cover plate 2 and slidable in the two slots 222 of the cover plate 2 upwards or downwards.

Thirdly, open the two side plates 21 pivoted at both side walls of the body 2 and then connect the cover plate 22 with the two side plates 21 by having the engagement blocks 34 of the two positioning members 3 respectively inserted into the insert grooves 214 of the two side plates 21 from an upper portion of the insert grooves 214 to a lower portion of the insert grooves 214 with the stop ends 35 of the two positioning members 3 stopped against the inner surfaces of the insert grooves 214 because the diameter of the stop ends 35 of the two positioning members 3 is larger than the width of the insert grooves 214 so that the two positioning members 3 can be engaged with the insert grooves 214 of the two side plates 21 to make the cover 22 securely connected with the two side plates 21.

Finally, extend the folded supporting member 4 to make the two engagement grooves 421 of the right frame 42 respectively engaged by the two stop blocks 411 of the left frame 41 so that the supporting member 4 can be extended and fixed horizontally, and then place the extended supporting member 4 across the two side plates 21 of the body 2 by having both ends of the supporting member 4 lowered into upper openings of the passages 212 of the two side plates 21 and stably rested against the corresponding engagement grooves 213 of the passages 212 of the two side plates 21 so that the grid member 5 can be supported by the extended supporting member 4 to grill food, as shown in FIG. 3.

Figure 5:
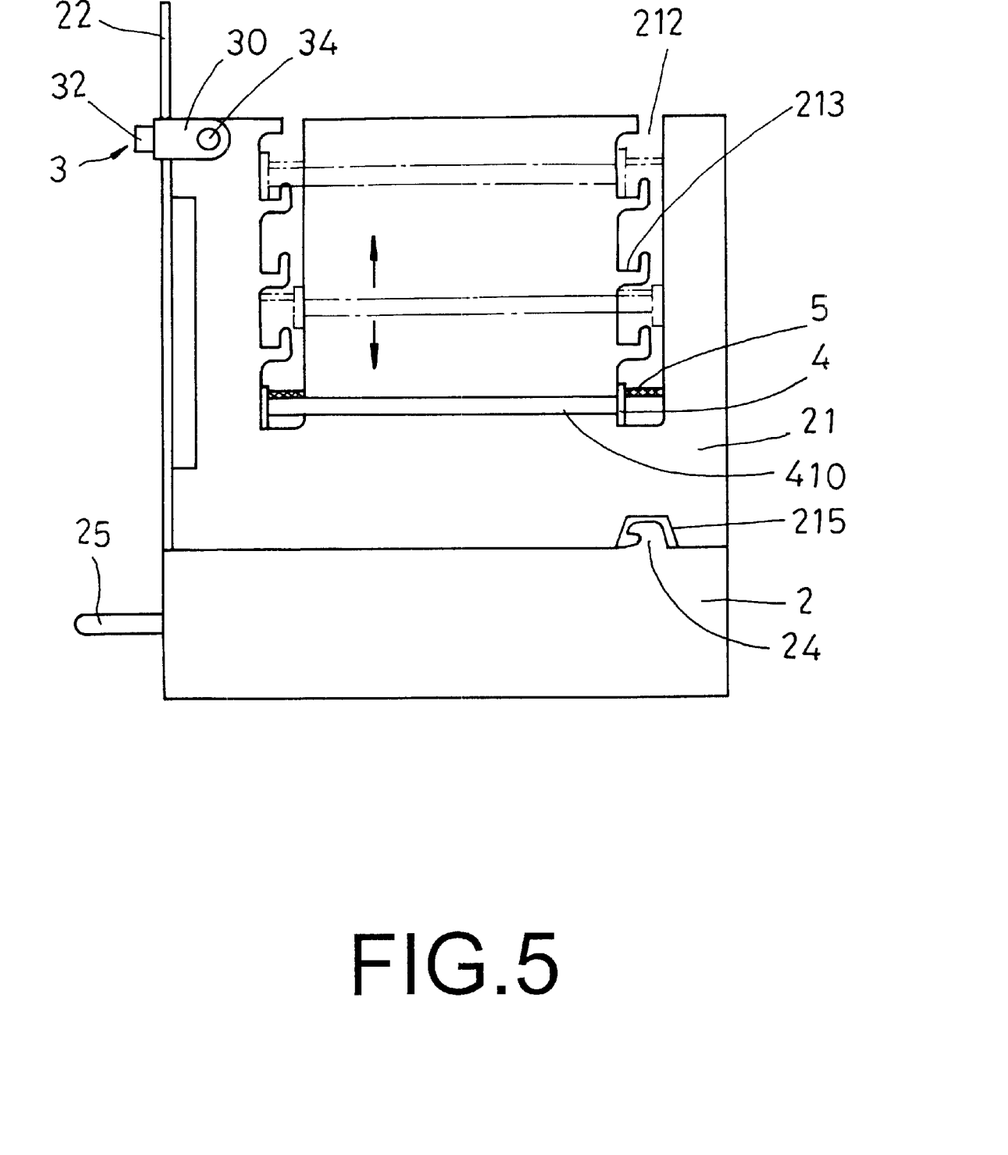
FIG. 5 is a schematic view of the collapsible barbecue grill in the present invention, showing a supporting member adjustable to be placed in various positions.

The extended supporting member 4 is adjustable to various positions as desired by having the both ends of the extended supporting member 4 rested against different engagement grooves 213 located in various heights so as to provide users with choices of different distances for grilling food.

Figure 7:
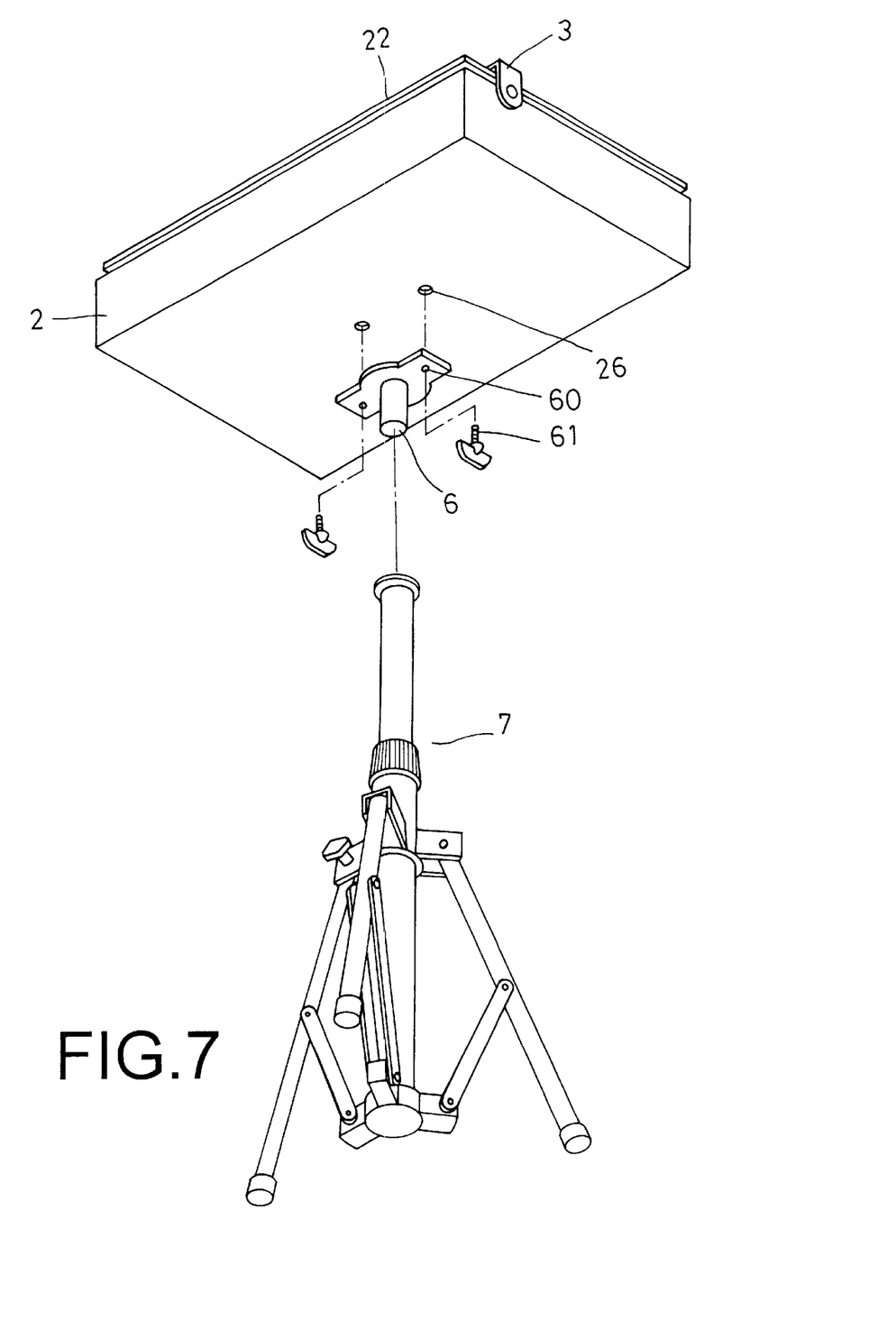
FIG. 7 is a perspective view of the collapsible barbecue grill in the present invention, showing an insert rod screwed at a bottom of the grill for being inserted into an extension tripod.

Moreover, the design of the insert rod 6 screwed at the bottom of the body 2 and inserted into the upper portion of the foldable extension tripod 7, as shown in FIG. 7, allows the barbecue grill of the present invention to be turned through 360° so that the users can turn the body 2 as desired for selecting preferred wind-blown directions when the food is grilled.

Furthermore, the employment of the foldable extension tripod 7 allows the barbecue grill of the present invention to be adjusted to various heights so that the users can select preferred heights at any time according to the needs of the users in different heights for a comfortable barbecue.

In folding, referring to the FIGS. 3 to 6, firstly take the grid member 5 away from the extended supporting member 4. Secondly, disengage the both ends of the extended supporting member 4 from the engagement grooves 213 of the passages 212 of the two side plates 21, and then lift the both ends of the extended supporting member 4 along the passages 212 of the two side plates 21 to the outside of the two side plates 21. Thirdly, fold the left frame 41 of the extended supporting member 4 oppositely toward the right frame 42 of the extended supporting member 4 with the pivot rod 40 of the left frame 41 serving as an axle to make the two stop blocks 411 of the left frame 41 received in the two grooves 422 of the right frame 42 and to make the grip 420 of the right frame 42 accommodated in the two grooves 412 of the left frame 41, and then put the folded supporting member 4 and the grid member 5 into the body 2. Finally, loose the threaded bolts 32 of the two positioning members 3 a little to allow the two positioning members 3 to be slide upwards along the slots 222 of the cover plate 22 to move the engagement blocks 34 of the two positioning members 3 upwards out of the insert groove 214 of the two side plates 21 so that the two side plates 21 and the cover plate 22 can be folded into the body 2 in turn, and then slide the two positioning members 3 forwardly along the slots 222 of the cover plate 22 to make the engagement blocks 34 of the two positioning members 3 hooked by the hooks 24 of the two side plates 21 so that the barbecue grill of the present invention can be quickly folded into a briefcase with all the aforementioned components stored in the body 2.

Figure 8:
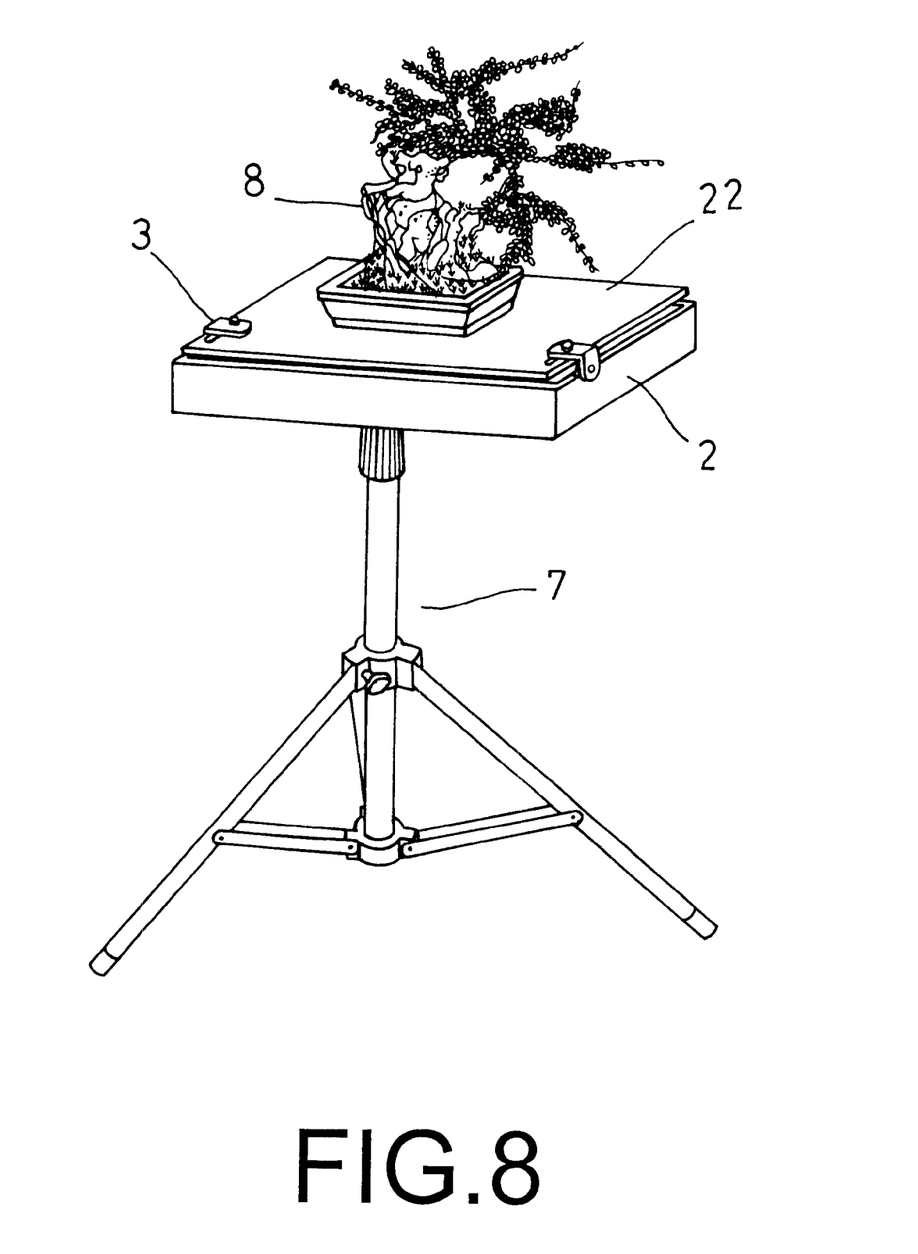
FIG. 8 is a schematic view of the collapsible barbecue grill in the present invention, showing a reference of the grill selectively combined with the extension tripod to be functioned as an exhibit shelf for placing decorations; and, FIG. 9 is a schematic view of the collapsible barbecue grill in the present invention, showing a reference of the grill folded into a briefcase to be carried by a user.

When the barbecue grill of the present invention is not used to grill food, it can be folded into a briefcase with the insert rod 6 screwed at the bottom of the body 2 to be inserted into the foldable extension tripod 7 to stand inside or outside the room with decorations 8, such as mini potted trees, sculpture, other ornaments, etc., placed thereon for pleasing the eyes, as shown in FIG. 8. Moreover, the free rotation of the body 2 of the barbecue grill around the foldable extension tripod 7 allows the barbecue grill to be functioned as an exhibit shelf to turn the decorations 8 to any angles for better seeing.

Figure 9:
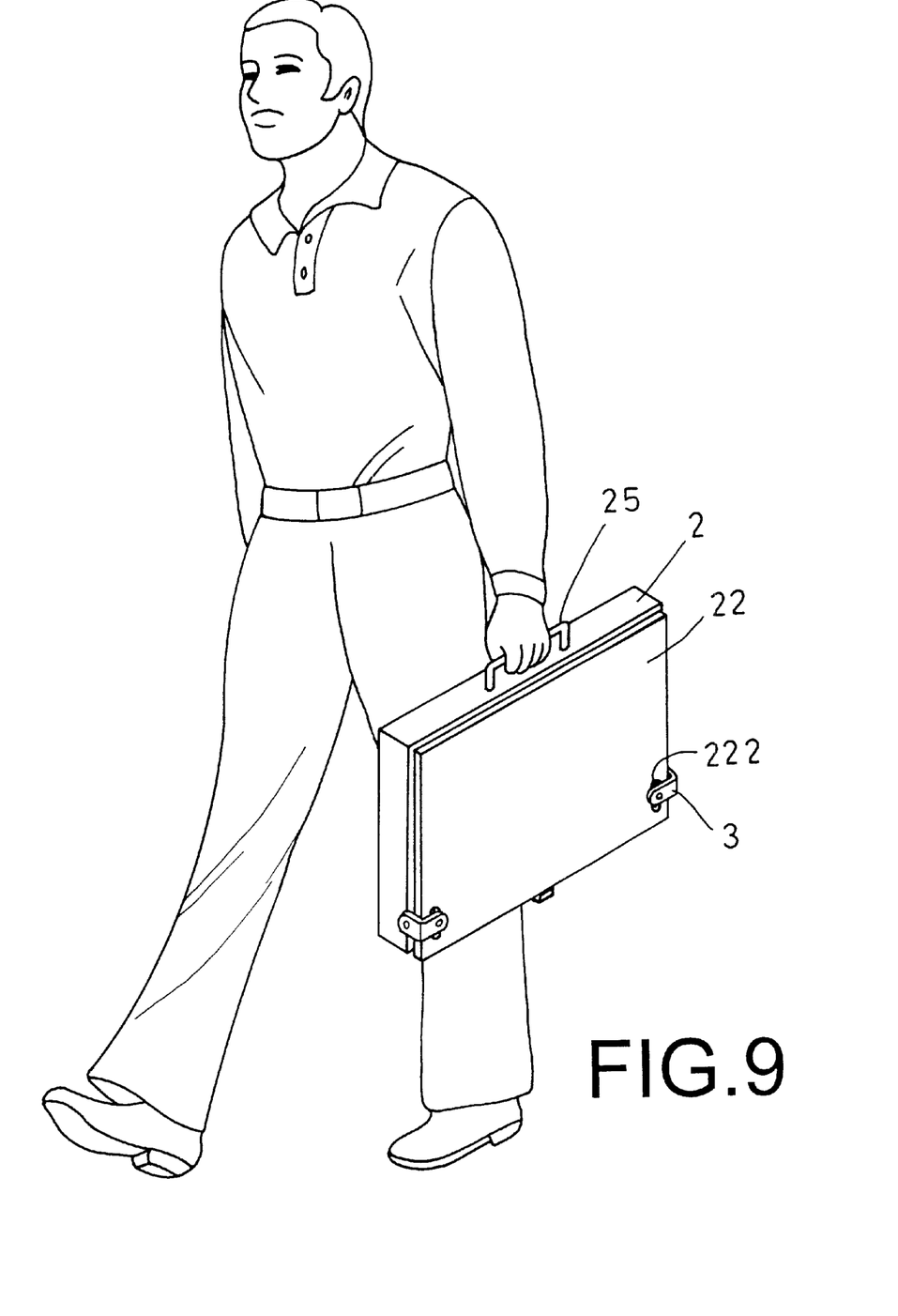

Alternatively, the barbecue grill of the present invention can be folded into a briefcase without insert rod 6 screwed at the bottom of the body 2 for the convenience of the user to hold the movable handle 25 disposed at the rear wall of the body 2 to carry outside, as shown in FIG. 9.

The invention has the following advantages, as can be understood from the aforesaid description.

1. The collapsible barbecue grill of the present invention can be quickly extended and used with easiness and with convenience.

2. In using, the design of the insert rod screwed at the bottom of the body for the convenience of being inserted into the foldable extension tripod allows the barbecue grill of the present invention to be turned through 360° so that the users can turn the body 2 as desired for selecting preferred wind-blown directions and to be adjusted to various heights so that the users can select preferred heights at any time according to the needs of the users in different heights.

3. The present invention combined with the foldable extension tripod can stand inside or outside the room with flowerpots or artworks placed thereon and can be freely turned to any angles for better seeing to be functioned as an exhibit shelf.

4. The present invention can be quickly folded into a reduced dimension for the convenience of storage in the room and the car only occupied with minimal space.

5. The present invention can be quickly folded into a reduced dimension for the convenience of carrying outside as a briefcase.

While the preferred embodiment of the invention has been described above, it will be recognized and understood that various modifications may be made therein and the appended claims are intended to cover all such modifications that may fall within the spirit and scope of the invention.

What is claimed is:

1. A collapsible barbecue grill comprising:

a body in a box shape capable of being pivoted with two side plates respectively disposed at both side walls thereof and a cover plate disposed at a rear wall thereof, each of said two side plates provided with at least one passage formed therein and an insert groove disposed at a rear end thereof, a plurality of engagement grooves disposed at one side of each said passage, two slots respectively disposed in proper places of both sides of said cover plate;

a plurality of positioning members capable of being screwed with said cover plate for connecting said two side plates and said cover plate when said body is extended; and, a supporting frame capable of being placed across said two side plates of said body for supporting a grid member.

2. The collapsible barbecue grill as claimed in claim 1, wherein an insert rod is capable of being combined with a bottom of said body for being inserted into a foldable extension tripod.

3. The collapsible barbecue grill as claimed in claim 1, wherein a movable handle is capable of being disposed at said rear wall of said body.

\* \* \* \* \*